(12) United States Patent
Tsutsumi

(10) Patent No.: US 8,654,374 B2
(45) Date of Patent: Feb. 18, 2014

(54) DATA TRANSMISSION APPARATUS AND METHOD

(75) Inventor: Tadaomi Tsutsumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1129 days.

(21) Appl. No.: 12/209,112

(22) Filed: Sep. 11, 2008

(65) Prior Publication Data

US 2009/0109470 A1    Apr. 30, 2009

(30) Foreign Application Priority Data

Oct. 29, 2007    (JP) .................................. 2007-280827

(51) Int. Cl.
*G06F 3/12*    (2006.01)
*G06K 15/00*    (2006.01)

(52) U.S. Cl.
USPC .......................... 358/1.15; 358/1.13; 358/1.18

(58) Field of Classification Search
USPC ................ 358/404, 407, 1.13–1.18, 515, 521
See application file for complete search history.

(56) References Cited

U.S. PATENT DOCUMENTS

2005/0055547 A1    3/2005  Kawamura
2006/0256392 A1*   11/2006 Van Hoof et al. ............. 358/402
2007/0211279 A1*   9/2007  Podl et al. .................... 358/1.15
2008/0024834 A1    1/2008  Matsui
2008/0033973 A1    2/2008  Tsutsumi
2008/0047020 A1*   2/2008  Masui ............................. 726/26
2008/0239346 A1*   10/2008 Fujii et al. ....................... 358/1.9

FOREIGN PATENT DOCUMENTS

| JP | 2000-187582   | 7/2000 |
| JP | 2003-271398 A | 9/2003 |
| JP | 2005-85090  A | 3/2005 |
| JP | 2006-94176  A | 4/2006 |
| JP | 2006-224354 A | 8/2006 |
| JP | 2007-36451  A | 2/2007 |

OTHER PUBLICATIONS

Japanese Office Action dated Mar. 27, 2012 in corresponding Japanese Patent Application No. 2007-280827.

* cited by examiner

*Primary Examiner* — King Poon
*Assistant Examiner* — Ibrahim Siddo
(74) *Attorney, Agent, or Firm* — Fitzpatrick, Cella, Harper & Scinto

(57) ABSTRACT

A data transmission apparatus acquires transmission processing information that includes a transmission destination for transmitting data, notification information related to transmission of data to the transmission destination, and a notification destination for notifying the notification information. The data transmission apparatus transmits data to the transmission destination included in the transmission processing information, and notifies the notification information to the notification destination included in the transmission processing information.

16 Claims, 7 Drawing Sheets

FIG. 3

```
<DATA PROCESSING NAME>AIUEO INSURANCE APPLICATION</DATA PROCESSING NAME>
<DATA PROCESSING CONTENT>
 <SCAN SETTINGS>
  <COLOR>COLOR</COLOR>
  <FORMAT>PDF</FORMAT>
  <RESOLUTION>600 DPI</RESOLUTION>
  <FILENAME>UPLOAD.PDF</FILENAME>
 </SCAN SETTINGS>
 <DATA REGISTRATION DESTINATION>HTTP://WWW.AIUEO.COM/UPLOAD</DATA REGISTRATION DESTINATION>
</DATA PROCESSING CONTENT>
<JOB INFORMATION NOTIFICATION>
 <NOTIFICATION DESTINATION>HTTP://AIUEOINSURANCE.COM/JOB</NOTIFICATION DESTINATION>
 <NOTIFICATION METHOD>BATCH</NOTIFICATION METHOD>
 <NOTIFICATION DAY>FRIDAY</NOTIFICATION DAY>
 <NOTIFICATION TIME>21:00</NOTIFICATION TIME>
 <REPETITION>YES</REPETITION>
 <ITEM>DATA PROCESSING NAME</ITEM>
 <ITEM>USERNAME</ITEM>
 <ITEM>UPLOAD DESTINATION</ITEM>
 <ITEM>UPLOAD FILENAME</ITEM>
 <ITEM>USAGE DATE AND TIME</ITEM>
 <ITEM>COLOR SETTING</ITEM>
 <ITEM>FORMAT</ITEM>
 <ITEM>RESOLUTION</ITEM>
 <ITEM>CHARGE</ITEM>
 <ITEM>JOB INFORMATION NOTIFICATION DESTINATION</ITEM>
 <ITEM>INSTALLATION LOCATION</ITEM>
</JOB INFORMATION NOTIFICATION>
```

FIG. 4

| | | |
|---|---|---|
| DATA PROCESSING NAME | AIUEO INSURANCE APPLICATION | 501 |
| USERNAME | tanaka | 502 |
| UPLOAD DESTINATION | Http://aiueo.com/upload/ | 503 |
| UPLOAD FILENAME | upload/.pdf | 504 |
| USAGE DATE AND TIME | 2007/5/6  10AM | 505 |
| COLOR SETTING | COLOR | 506 |
| FORMAT | PDF | 507 |
| RESOLUTION | 600dpi | 508 |
| CHARGE | 20 YEN | 509 |
| JOB INFORMATION NOTIFICATION DESTINATION | Http://aiueo.com/jp/ | 510 |
| MFP INSTALLATION LOCATION | ABC CONVENIENCE STORE, TOKYO OUTLET, XXX BUILDING 1F, 3-CHOME, OO WARD, TOKYO | 511 |

500

DATA TRANSMISSION APPARATUS AND METHOD

BACKGROUND OF THE INVENTION

1. Field of the Invention

The present invention relates to a data transmission apparatus and method.

2. Description of the Related Art

There are techniques for notifying the execution result of a job or the history of jobs such printing or scanning executed by a device such as a fax machine, a printer or a digital multifunction peripheral (MFP) to a user or an external apparatus. Japanese Patent Laid-Open No. 2000-187582 discloses a technique for transmitting job history information showing the history of a job by email to an email address input by a user.

However, with the foregoing conventional technology, modifying job information to be notified, the timing for notifying job information and the notification destination of job information necessarily involves modifying setting information or computer programs installed on a device. Thus, appropriately notifying information on jobs executed by a device is not always easy.

SUMMARY OF THE INVENTION

The present invention enables realization of appropriately setting the notification destination of information related to data transmission.

Also, the present invention enables realization of providing a data transmission apparatus that includes acquiring unit for acquiring transmission processing information that includes a transmission destination for transmitting data, notification information related to transmission of data to the transmission destination, and a notification destination for notifying the notification information, data transmitting unit for transmitting data to the transmission destination included in the transmission processing information, and notifying unit for notifying the notification information to the notification destination included in the transmission processing information.

Also, the present invention enables realization of providing a data transmission method that includes the steps of acquiring transmission processing information that includes a transmission destination for transmitting data, notification information related to transmission of data to the transmission destination, and a notification destination for notifying the notification information, transmitting data to the transmission destination included in the transmission processing information, and notifying the notification information to the notification destination included in the transmission processing information.

Further features of the present invention will be apparent from the following description of an exemplary embodiment with reference to the attached drawings.

BRIEF DESCRIPTION OF THE DRAWINGS

FIG. 3, showing a preferred embodiment of the present invention, shows exemplary data processing information.

FIG. 4, showing a preferred embodiment of the present invention, conceptually shows exemplary job information.

DESCRIPTION OF THE EMBODIMENTS

A preferred embodiment of the present invention will now be described with reference to the drawings.

Figure 1:
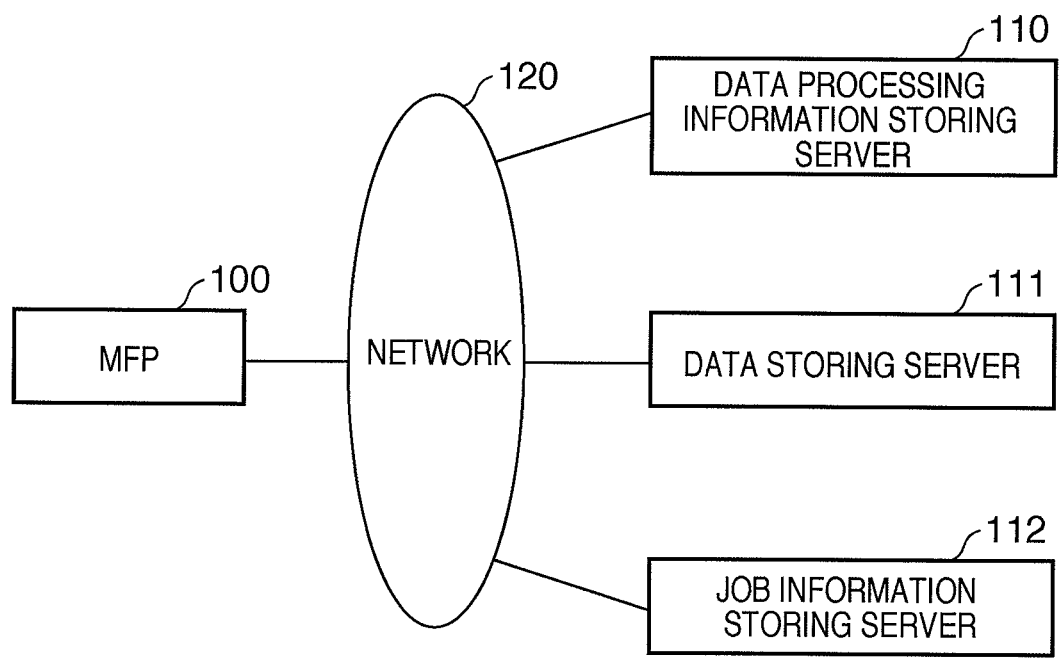
FIG. 1, showing a preferred embodiment of the present invention, shows an exemplary hardware configuration of a job information managing system.

FIG. 1 shows an exemplary hardware configuration of a job information managing system. In FIG. 1, the job information managing system is provided with an MFP 100, a data processing information storing server 110, a data storing server 111, and a job information storing server 112. The MFP 100, the data processing information storing server 110, the data storing server 111, and the job information storing server 112 are communicably connected to one another via a network 120.

The MFP 100 is a digital multifunction peripheral provided with functions including printing, copying, scanning, faxing, and network connectivity. Note that in FIG. 1, an example is given in which the data processing information storing server 110, the data storing server 111 and the job information storing server 112 are separate servers (computers), although they may be constituted by the same server. Also, the MFP 100 may have the functions of the data processing information storing server 110, the data storing server 111 and the job information storing server 112 which will be described below.

Figure 2:
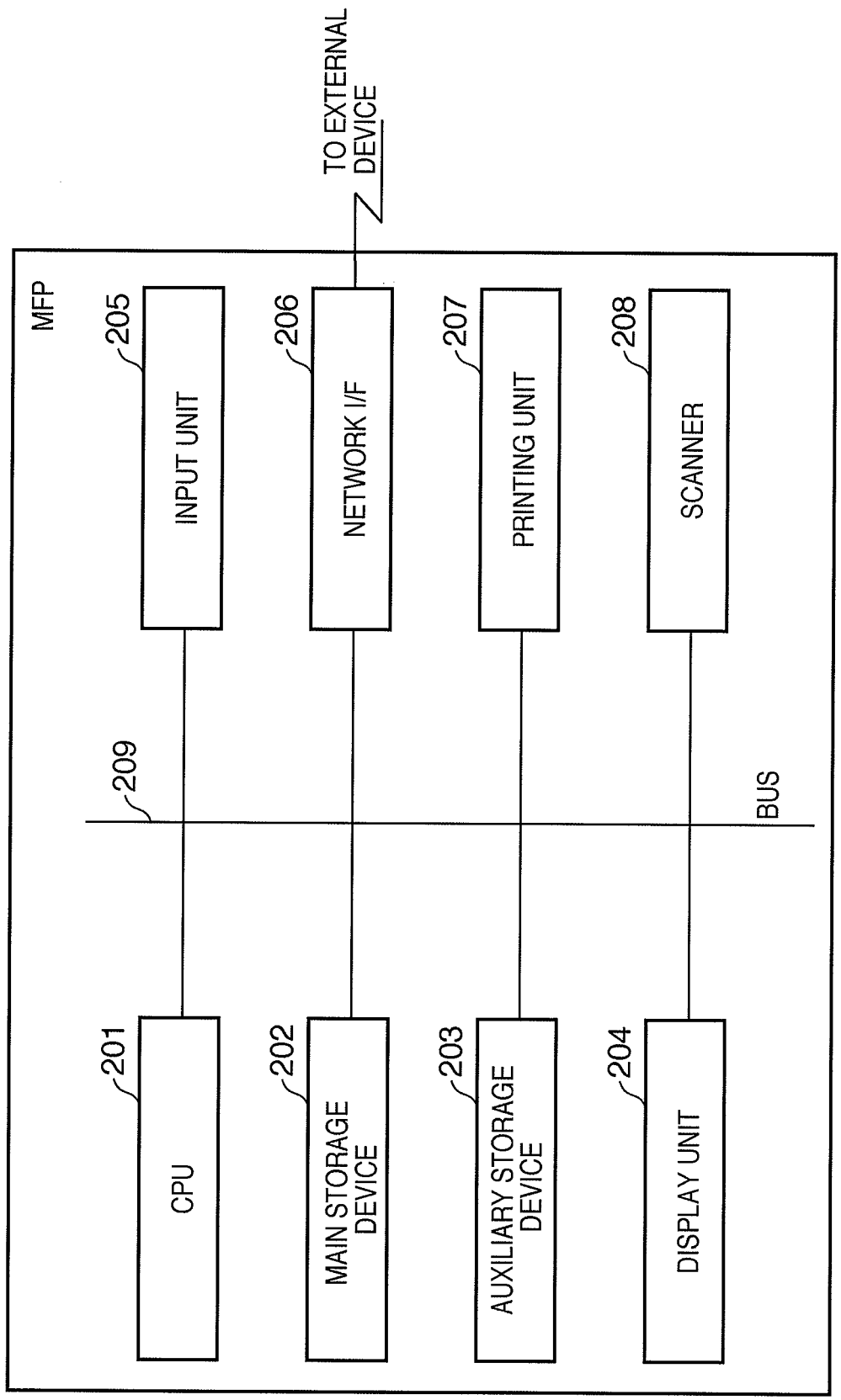
FIG. 2, showing a preferred embodiment of the present invention, shows an exemplary hardware configuration inside an MFP.

FIG. 2 shows an exemplary hardware configuration inside the MFP 100.

In FIG. 2, a central processing unit (hereinafter, abbreviated to CPU) 201 executes processing for performing overall control of the MFP 100. A main storage device 202 temporarily saves data acquired from a database, values during program operation, generated output data, and the like. The main storage device 202 also functions as a work area used when the CPU 201 executes a computer program.

An auxiliary storage device 203 stores programs for controlling the MFP 100, programs for performing data processing, data processing information, job information, setting files for these programs and information, and the like. A display unit 204 displays a graphical user interface and the like. The display unit 204 also has a touch panel. An input unit 205 is a user interface provided with buttons and the like for the user to perform various operations. A network interface (I/F) 206 is an interface for connecting to an external apparatus. The network I/F 206 is mutually connected to the data processing information storing server 110, the data storing server 111 and the job information storing server 112 via the network 120. A printing unit 207 is provided with a printer engine for performing printing. A scanner 208 is provided with a scan engine for performing scanning. A bus 209 links the foregoing apparatuses inside the MPF 100 to one another.

The data processing information storing server 110, the data storing server 111 and the job information storing server 112 have the constituent elements of the MPF 100 shown in FIG. 2 apart from the printing unit 207 and the scanner 208.

FIG. 3 shows exemplary data processing information. Data processing information 400 such as shown in FIG. 3 is stored in the data processing information storing server 110 as a result of an operation by a service provider that provides a service related to the data processing information 400.

A data processing name (element) 401 is the name of the data processing information defined by this data processing information 400.

A data processing content (element) 402 is constituted by scan settings 403 to 406 and a data registration destination 407.

The scan settings (elements) 403 to 406 show the scan settings (exemplary scan execution content) used when scanning is executed. Specifically, a color (element) 403 shows the color setting used when scanning is executed. A format (element) 404 shows the file format used when registering data read by the scanner 208 in a database. A resolution (element) 405 shows a reading resolution setting of the scanner 208. A filename (element) 406 shows the filename used when registering data read by the scanner 208 in a database.

The data registration destination (element) 407 shows a storage destination (exemplary output designation of job execution result) of data scanned by the scanner 208 of the MFP 100. Data scanned by the scanner 208 of the MFP 100 is registered in a database designated by the data registration destination (element) 407. Here, an example is given in which the URL of the data storing server 111, "http://www.aiueo.com/upload", is set as the data registration destination (element) 407.

A job information notification (element) 408 shows information (exemplary notification information) related to notification processing of job information. Specifically, a notification destination (element) 409 shows a notification destination of acquired job information. Here, an example is given in which the URL of the job information storing server 112, "http://aiueo.com/job/", is set as the data notification destination (element) 409.

A notification method (element) 410 shows a method of notifying job information. Here, an example is given in which "batch" indicating that acquired job information is to be notified collectively is set as the notification method (element) 410. Alternatively, "each time" indicating that acquired job information is to be notified every time it is acquired can be set as the notification method (element) 410.

A notification day (element) 411 shows the day for notifying job information. Here, an example is given in which "Friday" is set as the notification day (element) 411. A notification time (element) 412 shows the time for notifying job information. Here, an example is given in which "21:00" is set as the notification time (element) 412. Note that the notification day (element) 411 and the notification time (element) 412 are set in the case where "batch" is set as the notification method (element) 410, and are not set in the case where "each time" is set.

A repetition (element) 413 is for setting whether to repeatedly notify job information in the case where "batch" is set as the notification method (element) 410. Here, an example is given in which "yes" (repeat job information notification) is set as the repetition (element) 413. Note that a repetition mode such as this need not necessarily be provided.

Items (elements) 414 show the items of job information to be notified to the notification destination designated by the notification destination (element) 409. Information designated by items (elements) 414 is notified with the method designated by the notification method (element) 410 to the notification destination designated by the notification destination (element) 409. As aforementioned, in the case where "batch" is set as the notification method (element) 410, the information designated by the items (elements) 414 is notified at the time (timing) designated by the notification day (element) 411 and the notification time (element) 412. If "each time" is set as the notification method (element) 410, the information designated by the items (elements) 414 is notified when scanning ends (or when uploading ends).

In the present embodiment, as described above, job processing information is realized by data processing information 400.

FIG. 4 conceptually shows exemplary job information. The MFP 100 acquires (generates) job information during data processing based on the data processing information 400. The acquired job information is saved to the auxiliary storage device 203 of the MFP 100. FIG. 4 shows exemplary job information in the case where 414 (FIG. 3) is set as the job information in the data processing information 400 (FIG. 3).

In FIG. 4, a data processing name 501 shows the name of the data processing information 400. The user selects this data processing from the input unit 205 of the MFP 100, and the data processing name 401 in the data processing information 400 of the data processing selected by the user becomes the data processing name of the job information 500. A username 502 shows the name of the user that logged into the MFP 100 and instructed the data processing (job execution). An upload destination 503 shows the URL (data registration destination 407 of data processing information 400) of the database (data storing server 111) in which the data imported by the scanner 208 is registered.

An upload filename 504 shows the name of the uploaded file. A usage date and time 505 shows the date and time at which the job was executed, and a color setting 506 shows the color setting used when performing scan processing. A format 507 shows the data format used when registering the data imported by the scanner 208 in the database (data storing server 111). A resolution 508 shows the resolution used when reading the document with the scanner 208.

A charge 509 shows the charge for the executed job. An administrator or the like of the MFP 100, by operating the input unit 205, sets a charging amount per scanned sheet for monochrome and color, for example, on a charging setting screen displayed on the display unit 204. A value based on the charging amount is set in the charge 509 as charging information.

A job information notification destination 510 shows the URL (notification destination 409 of data processing information 400) of the notification destination (job information storing server 112) of the acquired job information.

An MFP installation location 511 shows information on the location in which the MFP 100 is installed. An administrator or the like of the MFP 100, by operating the input unit 205, inputs information on the installation location to an installation location setting screen displayed on the display unit 204. This information on the installation location is set in the MFP installation location 511.

Figure 5:
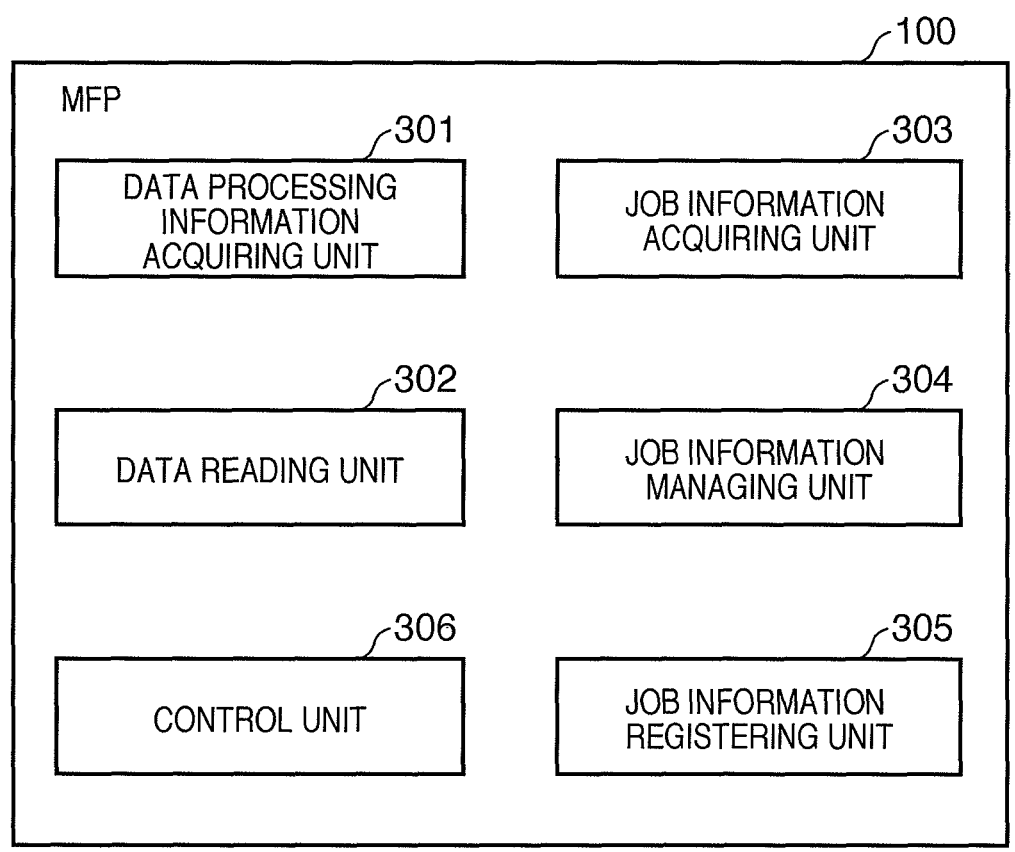
FIG. 5, showing a preferred embodiment of the present invention, shows an exemplary software configuration of the MFP.

FIG. 5 shows an exemplary software configuration of the MFP 100.

In FIG. 5, the MFP 100 has, as functions thereof, a data processing information acquiring unit 301, a data reading unit 302, a job information acquiring unit 303, a job information managing unit 304, a job information registering unit 305, and a control unit 306. These functions will be described using the flowcharts of FIGS. 6 and 7.

Figure 6:
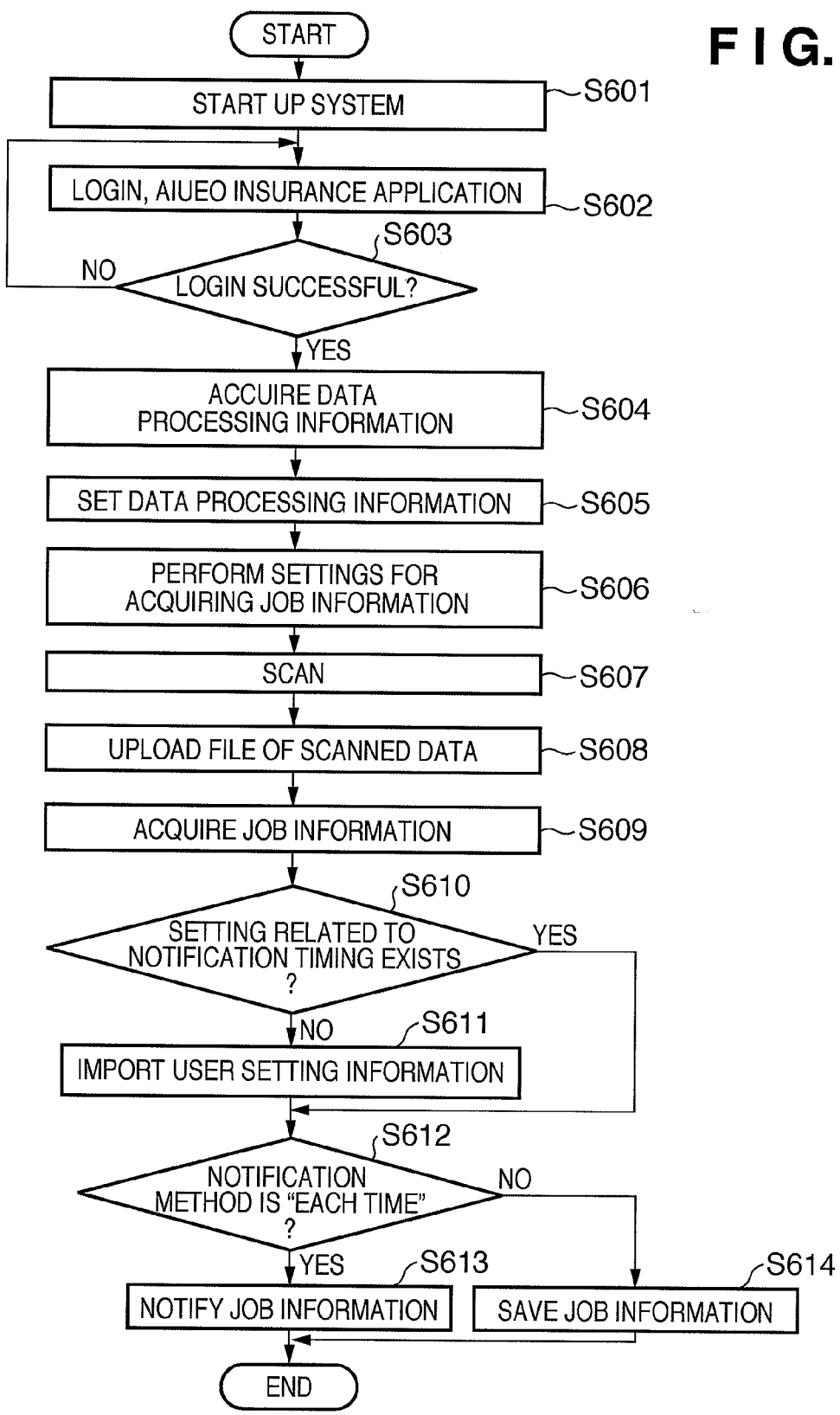
FIG. 6, showing a preferred embodiment of the present invention, is a flowchart illustrating an exemplary operation of the MPF when executing a job.

FIG. 6 is a flowchart illustrating an exemplary operation of the MPF 100 when executing a job.

In step S601, the control unit 306 starts up the MFP 100 in accordance with an operation of the input unit 205 by the user.

Next, in step S602, the control unit 306 displays a login screen on the display unit 204. Here, it is assumed that the control unit 306 displays a screen for selecting data processing on the display unit 204, and that the user selects data processing for applying for AIUEO Insurance on the screen. The user logs in by operating the input unit 205 to input a user account in a user account input region of the login screen, a password in a password input region of the login screen, and a data processing name in a processing name input region of the login screen.

Next, in step S603, the control unit 306 determines whether login was successful by determining whether the user account and password input to the login screen displayed at step S602 are valid. In this determination, the control unit 306 makes an inquiry to the data processing information storing server 110 (or another server) as to whether to permit this user to login. If it is determined that login failed, the processing returns to step S602.

On the other hand, if login is successful, the processing proceeds to step S604, where the data processing information acquiring unit 301 acquires data processing information 400 (FIG. 3) that is available to the logged in user from the data processing information storing server 110. In the present embodiment, the data processing information storing server 110 acquires data processing information 400 that includes the data processing name input during the logging in of step S602 from a database as data processing information 400 available to the logged in user, and transits the acquired data processing information 400 to the MFP 100. The data processing information 400 thus acquired by the MFP 100 includes the data processing name 401, the scan settings 403 to 406, the data registration destination 407 and the job information notification 408, as shown in FIG. 3.

Next, in step S605, the data processing information acquiring unit 301 acquires the data processing name 401, the scan settings 403 to 406 and the data registration destination 407 from the data processing information 400, and performs settings for scanning and data registration.

Next, in step S606, the data processing information acquiring unit 301 acquires the job information notification 408 from the data processing information 400, and performs settings for acquiring job information 500.

Next, in step S607, the data reading unit 302 scans the document set in the scanner 208, and creates a file for the scanned data in accordance with the scan settings 403 to 406. In the exemplary data processing information 400 shown in FIG. 3, the reading color is "color" as set in the color 403, and scanning is performed at "600 dpi" which is the reading resolution set in the resolution 405. A file in "PDF" format as set in the format 404 is generated as the file of the scanned data. The name of the file is "upload.pdf" as set in the filename 406.

Next, in step S608, the control unit 306 uploads the file generated in step S607 to the database (data storing server 111) designated by the data registration destination 407 acquired at step S604.

Next, in step S609, the job information acquiring unit 303 acquires (generates) job information 500 related to the executed job, based on the information used in steps S603, S607 and S608. Here, if, in steps S607 and S608, processing was performed with different information (values) from the information set in the data processing information 400, the job information acquiring unit 303 acquires (generates) job information 500 based on the information (values) actually processed.

Next, in step S610, the control unit 306 determines whether a setting related to the notification timing of the job information 500 exists in the data processing information 400 acquired in step S604. Specifically, if "each time" is set as the notification method 410, the control unit 306 determines that a setting related to the notification timing of the job information 500 exists in the data processing information 400. Again, if "batch" is set as the notification method 410, and the notification day 411, the notification time 412 and the repetition 413 are set, the control unit 306 determines that a setting related to the notification timing of the job information 500 exists in the data processing information 400. In other cases, the control unit 306 determines that a setting related to the notification timing of the job information 500 does not exist in the data processing information 400.

If it is determined that a setting related to the notification timing of the job information 500 does not exist, the processing proceeds to step S611, where the control unit 306 displays a job information notification setting screen on the display unit 204. The user, by operating the input unit 205, inputs user setting information that includes the notification method, the notification date and time, and whether or not to repeat notification to the job information notification setting screen. The control unit 306 imports the input user setting information. The processing then proceeds to step S612.

On the other hand, if it is determined that a setting related to the notification timing of the job information 500 does exist, step S611 is omitted and the processing proceeds to step S612.

Next, in step S612, the job information managing unit 304 determines whether "each time" is set as the notification method 410 in the data processing information 400 or as the notification method imported in step S611. If it is determined that "each time" is set as the notification method, the processing proceeds to step S613. The job information managing unit 304 then notifies (transmits) the job information 500 to the notification destination 409 (job information storing server 112) acquired in step S606. The job information managing unit 304 also manages the charging information generated as a result of the job being executed, for each notification destination of the job information 500, based on the charge 509. Once the above processing of step S613 ends, the processing of the FIG. 6 flowchart is ended.

As aforementioned, the usage date and time 505, the charge 509 and the MFP installation location 511 are included in the job information 500. Consequently, the job information storing server 112 stores and manages the usage date and time 505, the charge 509 and the MFP installation location 511 included in notified job information 500 in a charging information managing table in association with MFP, usage date and time, and amount due, respectively. An administrator (service provider etc.) of the job information storing server 112 pays the usage fee for the MFP 100, based on the content of the charging information managing table.

On the other hand, if "batch" is designated as the notification method, the processing proceeds to step S614. When the processing proceeds to step S614, the job information managing unit 304 saves the job information 500 acquired (generated) in step S609 to the job information registering unit 305 realized by the auxiliary storage device 203. At this time, the notification day 411, the notification time 412 and the repetition 413 included in the job information notification 408 set in step S606 or the notification date and time and the repetition information imported in step S611 in order to obtain the job information 500 are saved in association with the job information 500. The information saved in the job information registering unit 305 is managed by the job information managing unit 304. Once the above processing of step S614 ends, the processing of the FIG. 6 flowchart is ended.

Figure 7:
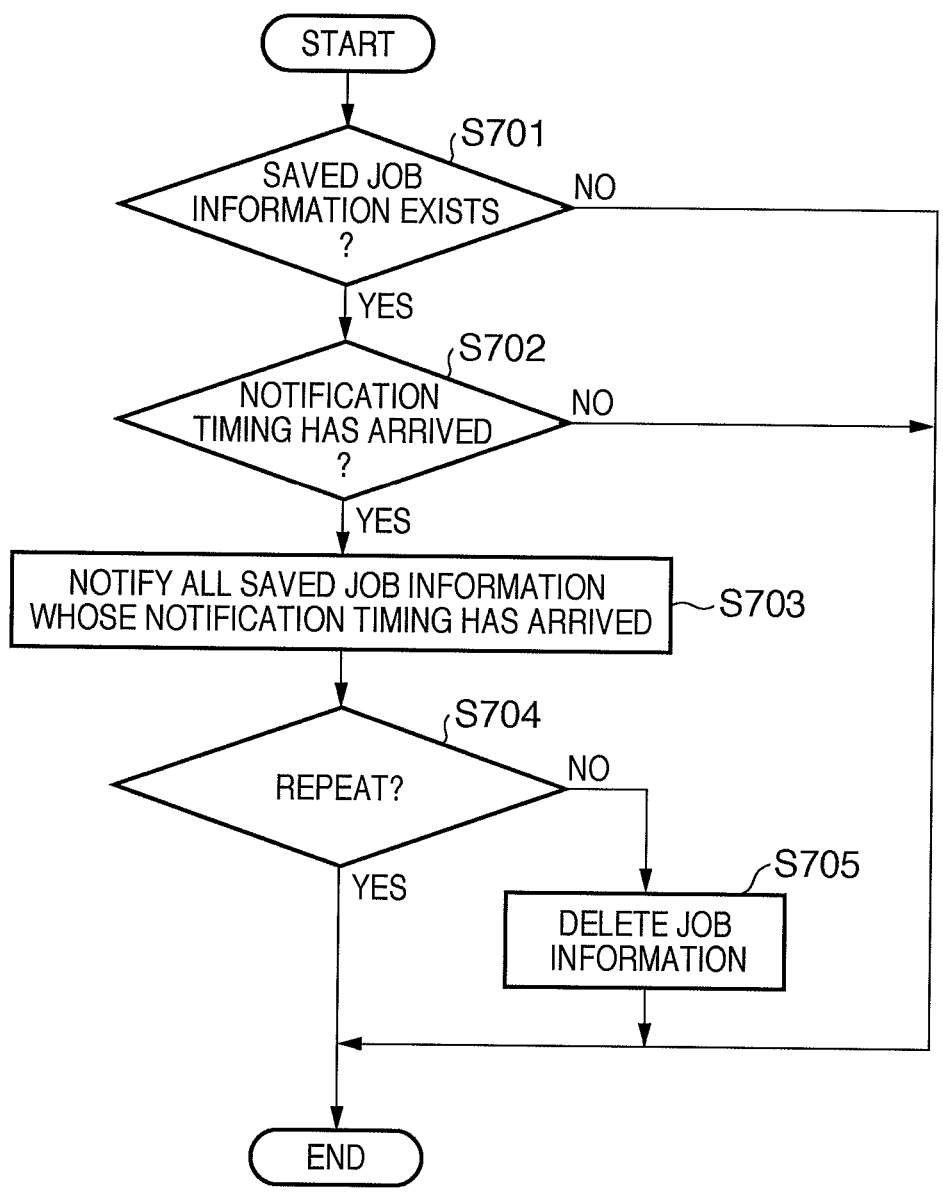
FIG. 7, showing a preferred embodiment of the present invention, is a flowchart illustrating an exemplary operation of the MPF when collectively transmitting saved job information at step S614 of FIG. 6.

FIG. 7 is a flowchart illustrating an exemplary operation of the MPF 100 when collectively transmitting saved job information 500 in step S614 of FIG. 6. Note that this processing shown in FIG. 7 is executed when an interrupt signal to the CPU 201 is issued, for example, when the MPF 100 is running.

In step S701, the job information managing unit 304 determines whether job information 500 is saved in the job information registering unit 305. If it is determined that job information 500 is not saved in the job information registering unit 305, the processing of the FIG. 7 flowchart is ended.

On the other hand, if it is determined that job information 500 is saved in the job information registering unit 305, the processing proceeds to step S702. The job information managing unit 304 then determines whether the timing for notifying saved job information 500 has arrived, based on the information associated with the job information 500, for example. As aforementioned, the notification day 411, the notification time 412, and the repetition 413 included in the job information notification 408 set at step S606 or the notification date and time and the repetition information imported at step S611 in order to obtain the job information 500 are associated with the job information 500.

If it is determined that the timing for notifying saved job information 500 has not arrived, the processing of the FIG. 7 flowchart is ended. On the other hand, if it is determined that the timing for notifying saved job information 500 has arrived, the processing proceeds to step S703. The job information managing unit 304 then notifies (transmits) the job information 500 whose notification timing has arrived, out of the saved job information 500, to the notification destination (job information storing server 112) shown in the job information notification destination 510. Note that if there is currently a plurality of pieces of job information 500 to be notified, the pieces of job information 500 are collectively notified (transmitted). The job information managing unit 304 then manages the charging information generated as a result of the job being executed, for each notification destination of the job information 500, based on the charge 509 for the notified job information 500. The job information storing server 112 stores and manages the usage date and time 505, the charge 509 and the MFP installation location 511 included in the notified job information 500 in the charging information managing table.

Next, in step S704, the job information managing unit 304 determines whether to repeatedly notify (notify again at the designated date and time) the job information 500 notified in step S703. This determination is performed based on the repetition 413 included in the job information notification 408 set in step S606 or the repetition information obtained in step S611. If it is determined not to repeatedly notify the job information 500 notified in step S703, the processing proceeds to step S705. The job information managing unit 304 then deletes the information related to the notified job information 500 from the job information registering unit 305, and the processing of the FIG. 7 flowchart is ended. On the other hand, if it is determined to repeatedly notify the job information 500 notified in step S703, the processing of the FIG. 7 flowchart is ended without performing the processing step S705 because that job information 500 will again be notified later.

Note that a mode for repeated notification need not be provided, in which case notified job information is deleted.

In the present embodiment, as described above, data processing information 400 is stored in advance in the data processing information storing server 110. This data processing information 400 includes scan settings 403 to 406 related to the execution instruction content of a job, a data registration destination 407 related to the registration destination of the result of executing a job, and a job information notification 408 related to notification of job information 500 related to a job. The MFP 100 acquires data processing information 400 available to the logged in user from the data processing information storing server 110. The MFP 100 then executes the job based on the acquired data processing information 400, and uploads the file of the scanned data to the data storing server 111, which is the registration destination shown in the data processing information 400. The MFP 100 also generates job information 500 related to the executed job, and transmits the generated job information 500 to the notification destination shown in the data processing information 400, once the file of the scanned data has been uploaded or at the date and time shown in the data processing information 400. Consequently, by setting the data processing information 400 in the data processing information storing server 110, job information 500 to be notified, the timing for notifying job information 500, the notification destination of job information 500, and the like, can be set for each job. Therefore, programs or setting information inside a device that executes jobs such as the MFP 100, a fax machine, a printer or a scanner no longer need to be modified, enabling settings related to job information 500 to be performed more easily than conventionally.

In the present embodiment, information related to the timing for notifying job information 500 (notification method 410, notification day 411, notification time 412, repetition 413) is set in the data processing information 400. Consequently, job information 500 can be notified at the required timing.

Further, in the present embodiment, it is possible to charge the service provider that provided the data processing system as a service, rather than the user that used the MFP 100, because charging information (charge 509) is set in the job information 500.

In the present embodiment, job information 500 can be reliably notified in the case where information related to the timing for notifying job information 500 is not shown in the data processing information 400, because equivalent information is input in accordance with an operation by the user.

Note that while the present embodiment was described using scanning as an exemplary job, the job is not limited to scanning, and may be printing, faxing, copying, or the like.

Also, while the present embodiment was described using the MFP 100 as an exemplary device, the device is not limited to the MFP 100, and may be a printer, fax machine, copier or the like.

In the present embodiment, the data processing information storing server 110 retrieves data processing information 400 available to a logged in user, with the data processing name input during login (step S604) as a key. However, this is not necessarily the case. For example, the user account or the like input during login may also be used as a key.

Means constituting a data transmission apparatus in the foregoing embodiment of the present invention and steps of a data transmission method can realized by the operation of a computer program stored in the RAM or ROM of a computer, or the like. This computer program and a computer-readable recording medium having the program recorded thereon are covered by the present invention.

The present invention can also take an embodiment as a system, an apparatus, a method, a computer program or a storage medium, for example, or may, specifically, be applied to a system constituted by a plurality of devices or an apparatus composed of a single device.

Moreover, the present invention covers the case where a software program (program corresponding to the flowcharts shown in FIGS. 6 and 7 in the preferred embodiment) that realizes the functions of the foregoing embodiment is directly or remotely supplied to a system or an apparatus. The case where the present invention is achieved as a result of a computer in the system or apparatus reading out and executing the supplied program code is also covered.

Consequently, the present invention is also realized by the actual program code installed on the computer, in order to realize the functions and processes of the present invention by computer. In other words, the present invention also covers the actual computer program for realizing the functions and processes of the present invention.

In this case, the computer program may take the form of object code, a program executed by an interpreter, script data supplied to an operating system, or the like, provided the functions of the program are included therein.

Recording media for supplying the program include, for example, flexible disk, hard disk, optical disk, magneto-optical disk, MO, CD-ROM, CD-R and CD-RW. Magnetic tape, nonvolatile memory card, ROM, DVD (DVD-ROM, DVD-R) and the like are also available.

Alternatively, the program can be supplied by connecting to a website on the Internet using the browser of a client computer, and downloading the actual computer program of the present invention or a compressed file including an auto-install function from the website onto a recording medium such as a hard disk.

This can also be realized by dividing the program code constituting the program of the present invention into a plurality of files and downloading the respective files from different websites. In other words, a World Wide Web (WWW) server that allows a plurality of users to download program files for realizing the functions and processes of the present invention by computer is also covered by the present invention.

It is also possible to distribute the program of the present invention to users in encrypted form stored on a storage medium such as a CD-ROM, and to allow users that meet a prescribed requirement to download decryption key information from a website via the Internet, and install the program on a computer by executing the encrypted program using the downloaded key information.

The functions of the foregoing embodiment are realized by a computer executing the read program. Alternatively, an OS or the like running on a computer may perform part or all of the actual processing based on instructions in the program, with the functions of the foregoing embodiment being realizable as a result of this processing.

Further, the program read out from the recording medium may be written to a memory provided in a function expansion board inserted in a computer or a function expansion unit connected to a computer, and a CPU or the like provided in the function expansion board or the function expansion unit may then perform part or all of the actual processing based on instructions in the program, with the functions of the foregoing embodiment being realized as a result of this processing.

Note that the foregoing embodiment merely illustrates a specific example for implementing the invention, and the technical scope of the invention is not to be construed restrictively as a result of this embodiment. That is, the invention can be implemented in various forms without departing from the technical idea or main features thereof.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2007-280827, filed on Oct. 29, 2007, which is hereby incorporated by reference herein in its entirety.

What is claimed is:

1. A data job processing apparatus comprising:
a reading unit configured to read data from an original;
an acquiring unit configured to acquire, from an external apparatus, data processing information that includes a scan setting for reading the data by the reading unit, a data registration destination for registering the data read by the reading unit in accordance with the scan setting, job information related to a data registration job for uploading the read data to the data registration destination, and notification information related to notification destination of the job information;
an uploading unit configured to upload data read by the reading unit in accordance with the scan setting included in the data processing information acquired by the acquiring unit, to the data registration destination included in the acquired data processing information;
a generation unit configured to generate the job information related to the data registration job which has been executed by the uploading unit, based on the notification information included in the data processing information acquired by the acquiring unit; and
a notifying unit configured to notify of the job information generated by the generating unit based on the notification information included in the data processing information acquired by the acquiring unit,
wherein the data processing information including the job information and the notification information includes a timing for notifying the notification destination of the job information, and
wherein the notifying unit notifies the notification destination of the job information generated by the generating unit at the timing included in the notification information.

2. The apparatus according to claim 1, wherein the acquiring unit acquires the data processing information from a server on a network.

3. The apparatus according to claim 1, wherein
the data processing information acquired by the acquiring unit includes identification information for identifying the data processing information, and
the notifying unit notifies the identification information to the notification destination in accordance with the notification information.

4. The apparatus according to claim 1, wherein
the acquiring unit comprises an identification unit configured to identify a user of the data processing information, and
the notifying unit notifies identification information of the user identified by the identification unit to the notification destination in accordance with the notification information.

5. The apparatus according to claim 1, wherein the notifying unit notifies identification information of the data registration destination to the notification destination in accordance with the notification information.

6. The apparatus according to claim 1, wherein the notifying unit notifies identification information of the data to the notification destination in accordance with the notification information.

7. A job processing method comprising the steps of:
reading data from an original;
acquiring, from an external apparatus, data processing information that includes a scan setting for reading the data in the reading step, a data registration destination for registering the data read in the reading step in accordance with the scan setting, job information related to a data registration job for uploading the read data to the data registration destination, and, notification information related to a notification destination of the job information;
uploading data read in the reading step in accordance with the scan setting included in the data processing information acquired in the acquiring step, to the data registration destination included in the acquired data processing information;
generating the job information related to the data registration job which has been executed in the uploading step, based on the notification information included in the data processing information acquired in the acquiring step; and
notifying of the job information generated by the generating step based on the notification information included in the data processing information acquired in the acquiring step,
wherein at least one of the steps is performed using at least one processor,
wherein the data processing information including the job information and the notification information includes a timing for notifying the notification destination of the job information, and
wherein the notifying step notifies the notification destination of the job information generated in the generating step at the timing included in the notification information.

8. The method according to claim 7, wherein in the acquiring step, the data processing information is acquired from a server on a network.

9. The method according to claim 7, wherein
the data processing information acquired in the acquiring step includes identification information for identifying the data processing information, and
in the notifying step, the identification information is notified to the notification destination in accordance with the notification information.

10. The method according to claim 7, wherein in the notifying step, identification information of the data uploaded in the uploading step is notified to the notification destination in accordance with the notification information.

11. A non-transitory computer-readable storage medium storing a computer program for a computer, the computer program comprising the steps of:
reading data from an original;
acquiring, from an external apparatus, data processing information that includes a scan setting for reading the data in the reading step, a data registration destination for registering the data read in the reading step in accordance with the scan setting, job information related to a data registration job for uploading the read data to the data registration destination, and notification information related to a notification destination of the job information;
uploading data read in the reading step in accordance with the scan setting included in the data processing information acquired in the acquiring step, to the data registration destination included in the acquired data processing information;
generating the job information related to the data registration job which has been executed in the uploading step, based on the notification information included in the data processing information acquired in the acquiring step; and
notifying of the job information generated by the generating step based on the notification information included in the data processing information acquired in the acquiring step,
wherein the data processing information including the job information and the notification information includes a timing for notifying the notification destination of the job information, and
wherein the notifying step notifies the notification destination of the job information generated in the generating step at the timing included in the notification information.

12. The storage medium according to claim 11, wherein in the acquiring step, the data processing information is acquired from a server on a network.

13. The storage medium according to claim 11, wherein
the data processing information acquired in the acquiring step includes identification information for identifying the data processing information, and
in the notifying step, the identification information is notified to the notification destination in accordance with the notification information.

14. The storage medium according to claim 11, wherein in the notifying step, identification information of the data uploaded in the uploading step is notified to the notification destination in accordance with the notification information.

15. The apparatus according to claim 1, wherein the job information included in the data processing information includes information of the scan setting and information obtained by the reading of the reading unit.

16. The apparatus according to claim 15, wherein the generating unit generates the job information based on the information obtained by the reading of the reading unit in a case where the information of the scan setting is different from the information obtained by the reading of the reading unit.

* * * * *